Patented July 29, 1952

2,605,258

UNITED STATES PATENT OFFICE 2,605,258

COPOLYMERS OF ALLYLOXYETHANOL WITH ACRYLONITRILE AND/OR METHACRYLONITRILE

Henry S. Rothrock, Wilmington, Del., assignor to E. I. du Pont de Nemours and Company, Wilmington, Del., a corporation of Delaware No Drawing. Application May 12, 1951, Serial No. 226,105

13 Claims. (Cl. 260—85.5)

This invention relates to polymeric materials, and more particularly to a new class of acrylonitrile and methacrylonitrile copolymers.

Synthetic fibers based on acrylonitrile polymers have recently made their their appearance. Since unmodified polyacrylonitrile has poor dye receptivity, the polymers used in the preparation of fibers are advantageously modified acrylonitrile polymers or copolymers that contain a highly dye receptive component. An example of such a modified polymer is that obtained by copolymerizing acrylonitrile with a small amount (2 to 10%) of vinylpyridine. Although such copolymers have good dye receptivity, their color stability at elevated temperatures is not altogether satisfactory.

This invention has as an object the preparation of novel acrylonitrile and methacrylonitrile polymers. A further object is the preparation of such polymers having good dye receptivity and color stability at elevated temperatures and satisfactory for the preparation of films and fibers. Other objects will appear hereinafter.

These objects are accomplished by the present invention of copolymers of acrylonitrile or methacrylonitrile, i. e., of $CH_2$=CRCN wherein R is $(CH_2)_nH$ and $n$ is a cardinal number not greater than one, with allyloxyethanol, the latter being present in the copolymer to the extent of from 2 to 90% by weight thereof but preferably to the extent of 5 to 15%, particularly if the copolymers are to be used in the preparation of fibers.

The copolymers of the present invention are prepared by bringing the monomers in contact with a free radical polymerization initiator, i. e., one which generates free radicals at the polymerization temperature. See Bawn—The Chemistry of High Polymers, page 47. Thus, allyloxyethanol ($CH_2$=$CHCH_2OCH_2CH_2OH$) and acrylonitrile ($CH_2$=CHCN) or methacrylonitrile ($CH_2$=$C(CH_3)CN$) are mixed with a small amount (0.01 to 5.0%) of the free radical producing catalyst and maintained in the temperature range at which the catalyst is active until the desired degree of copolymerization is attained. The reaction can be continued until polymerization is essentially complete or the reaction may be interrupted prior to completion by adding a suitable inhibitor or by separating the polymer from the reaction mixture. Since the nitrile, and particularly acrylonitrile, has a tendency to polymerize more rapidly than the allyloxyethanol, the proportion of nitrile in the copolymer is generally higher than in the original mixture of monomers. Depending upon the polymerization conditions and the composition of the copolymer desired, the ratio of allyloxyethanol to the unsaturated nitrile in the initial mixture of monomers may vary from about 1:20 to 60:1. For the preparation of fiber-forming copolymers the ratio is preferably between 1:20 and 1:1.

The temperature used in the polymerization depends upon the catalyst employed, but will generally be within the range of 25 to 150° C. Thus, certain catalysts, e. g., mixtures of thiourea and hydrogen peroxide, are effective at ordinary temperatures (25° C.) or even lower. On the other hand, peroxides per se, e. g. benzoyl peroxide, and azo catalysts, e. g. $a,a'$-azodiisobutyronitrile, are normally used in the range from 50 to 100° C.

The polymerization can be carried out in the presence or absence of solvents or non-solvents. A particularly suitable method of polymerization consists in heating the reactants at 25 to 75° C. in an aqueous system containing an ammonium or alkali metal persulfate and a reducing agent, such as ammonium or alkali metal bisulfite. When this method of polymerization is used, it is desirable to keep the pH of the mixture on the acid side, preferably in the pH range of 2–5. A dispersing agent may also be added.

The following examples in which parts are by weight are illustrative of the invention.

Example I

A mixture of 2.27 parts (10 mol percent) allyloxyethanol, 10.6 parts (90 mol percent) acrylonitrile, 0.1 part ammonium persulfate, and 0.1 part sodium bisulfite in 100 parts water was polyagitated in an atmosphere of nitrogen at 30° C. for 17 hours. The copolymer so obtained was filtered, washed with water, and dried in air to give 10.3 parts of colorless powder. Analysis showed the polymer to contain 24.31% nitrogen, indicating 92% acrylonitrile and 8.0% allyloxyethanol. This polymer was insoluble in common solvents, was soluble in dimethylformamide, and exhibited an inherent viscosity of 1.50 (0.2% in dimethylformamide at 25° C.). A film cast from a dimethylformamide solution of the polymer softened above 200° C., remained essentially colorless after heating at 165° C. for 20 minutes, and accepted acetate dyes, such as the scarlet dye obtained by coupling diazotized paranitroaniline with the sodium sulfate ester of N-beta-hydroxyethylaniline, $NaO_3SOC_2H_4NHC_6H_5$. The polymer absorbed 4.38% of its weight of moisture.

Example II

A mixture of 5.10 parts (20 mol percent) allyloxyethanol, 10.6 parts (80 mol percent) acrylonitrile, 0.1 part ammonium persulfate, and 0.1 part sodium bisulfite in 100 parts of water was merized at 30° C. and the product isolated as described above in Example I. There was obtained 10.7 parts of colorless copolymer. Analysis showed the polymer to contain 23.04 percent nitrogen, corresponding to 87.3 percent acrylonitrile and 12.7 percent allyloxyethanol. This polymer was isoluble in common solvents but was soluble in dimethylformamide, and exhibited an inherent viscosity of 1.46 (0.2% in dimethylformamide). A film cast from a dimethylformamide solution of the polymer softened at 217° C., remained essentially colorless after heating at 165° C. for 20 minutes, and accepted both acetate and vat dyes. The polymer absorbed 5.67 percent moisture.

*Example III*

A mixture of 8.75 parts (30 mol percent) allyloxyethanol, 10.6 parts (70 mol percent) acrylontrile, 0.1 part ammonium persulfate, and 0.1 part sodium bisulfite in 100 parts water was polymerized and the product isolated as described above in Example I. There was obtained 10.6 parts of colorless copolymer. Analysis showed the polymer to contain 22.36 percent nitrogen, from which it was calculated that the polymer contained 84.6 percent acrylonitrile and 15.4 percent allyloxyethanol. This polymer was insoluble in common solvents, but was soluble in dimethylformamide, and exhibited an inherent viscosity of 1.30 (0.2% in dimethylformamide at 25° C.). A film cast from a dimethylformamide solution of the polymer softened at 178° C., remained essentially colorless after heating at 165° C. for 20 minutes, and accepted acetate and vat dyes. The polymer absorbed 6.29 percent moisture.

*Example IV*

A solution of 10.6 parts (70 mol percent) acrylonitrile, 8.75 parts (30 mol percent) allyloxyethanol, and 0.045 part $\alpha,\alpha'$-azodiisobutyronitrile in about 90 parts benzene was agitated at 60° C. in an atmosphere of nitrogen for 17 hours. The copolymer (1.1 parts) so obtained was filtered off, washed and fresh benzene, and air dried. Analysis of the copolymer showed 19.18 percent nitrogen, indicating that it contained 72.6 percent acrylonitrile and 27.4 percent by weight of allyloxyethanol. The polymer was soluble in dimethylformamide and had an inherent viscosity of 0.29, as determined in an 0.2% solution in dimethylformamide at 25° C. A pressed film prepared from the copolymer softened at 88° C. and was somewhat brittle. The polymer absorbed 16.3 percent moisture.

The above example was repeated except for the ratio of acrylonitrile to allyloxyethanol (and using 0.1 mol percent $\alpha,\alpha'$-azodiisobutyronitrile) with the following results:

| Initial mol ratio of allyloxyethanol/ acrylonitrile | Weight percent of allyloxyethanol in copolymers | Polymer Properties | | |
|---|---|---|---|---|
| | | Inherent Viscosity | Softening Point (°C.) | Percent Water Absorption |
| 20:80 | 21.0 | 0.32 | 120 | 4.83 |
| 10:90 | 11.8 | 0.51 | >200 | 1.18 |
| 5:95 | 7.1 | 0.77 | >200 | 0.81 |

*Example V*

A mixture of 510 parts allyloxyethanol, 9 parts acrylonitrile and 3.6 parts acetyl peroxide was heated at 65° C. for 58 hours. This yielded 32 parts of copolymer in the form of a light brown, viscous liquid, which was soluble in n- propyl alcohol. On the assumption that the acrylonitrile was completely polymerized, the copolymer contained 28% by weight of acrylonitrile and 72% by weight of allyloxyethanol.

*Example VI*

A mixture of 125 parts allyloxyethanol, 125 parts acrylonitrile, and 15 parts of di-tertiary butyl peroxide was added during the course of 4.5 hours to 250 parts of allyloxyethanol heated to 125–130° C. After 1.5 hours additional heating at this temperature the reaction mixture was subjected to distillation under reduced pressure on a steam bath to remove unpolymerized monomer. The residue consisted of 270 parts of resinous copolymer containing approximately 54% by weight of allyloxyethanol. The copolymer was soluble in dioxane, but essentially insoluble in xylene and in butyl alcohol.

*Example VII*

A solution of 13.4 parts (90 mol percent) methacrylonitrile, 2.27 parts (10 mol percent) allyloxyethanol, and 0.1 part $\alpha,\alpha'$-azodiisobutyronitrile in about 90 parts of benzene was agitated at 60° C. in an atmosphere of nitrogen for 18 hours. The copolymer (0.54 part) so obtained was filtered off, washed with methanol, and dried in vacuum at 60° C. Analysis of the copolymer showed 19.69 percent nitrogen, indicating that it contained 94.1 percent methacrylonitrile and 5.9 percent allyloxyethanol. The polymer was soluble in dimethylformamide and had an inherent viscosity of 0.32, as determined in an 0.2% solution in dimethylformamide at 25° C.

The term "inherent viscosity" is symbolized by the expression $$\eta_{inh.} = \frac{\ln \eta_r}{c}$$

where $c$ = concentration, gm. solute/100 cc. solutio $\eta_r$ = relative viscosity = $\frac{\eta_1}{\eta_2} = \frac{d_1 t_1}{d_2 t_2}$ $\eta_1$ = coeff. of viscosity of solution $d_1$ = density of solution $t_1$ = time of flow for solution $\eta_2$ = coeff. of viscosity for pure solvent $d_2$ = density of pure solvent $t_2$ = time of flow for pure solvent See Cragg, Journal of Colloid Science, 1, 266 (1946); and Getman and Daniels "Outlines of Theoretical Chemistry," 6th ed., page 51, John Wiley & Sons, New York, N. Y., 1937. Inherent viscosity differs from intrinsic viscosity only in that intrinsic viscosity is the limiting inherent viscosity, i. e., $$\text{Intrinsic viscosity } \eta_i = \lim_{c \to 0} \left( \frac{\ln \eta_r}{c} \right)$$

The products of this invention are copolymers containing a plurality of recurring

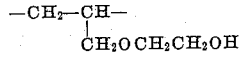

and

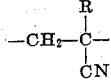

units, wherein R is $(-CH_2-)_nH$ wherein n is a cardinal number not greater than one, i. e., hydrogen or methyl. The products are, in general, solid resinous materials whose softening points depend upon the amount of allyloxyethanol present. An allyloxyethanol/acrylonitrile copolymer containing 8% of allyloxyethanol softens at about 250° C., whereas a copolymer containing 20% allyloxyethanol softens at about 90° C. The solubility of the products likewise varies with the allyloxyethanol content, but for the most part the products are soluble in dimethylformamide. The viscosity and molecular weight of the products depend upon the method of preparation and the purity of the reactants. The preferred products from the standpoint of film and fiber properties have inherent viscosities above 1.2, where "inherent viscosity" is defined as in Journal of Colloid Science 1, 266 (1946).

Although this invention is concerned primarily with two component copolymers of allyloxyethanol with acrylonitrile or methacrylonitrile, it includes also three component copolymers of allyloxyethanol with both acrylonitrile and methacrylonitrile. It is also within the scope of the invention to include minor amounts (up to 10% by weight of the copolymer) of other unsaturated materials subject to addition polymerization by reason of an ethylenic double bond, e. g. vinyl acetate, vinyl chloride, vinylidene chloride, styrene, methyl methacrylate, and acrylamide.

As already indicated, free radical producing catalysts effective in the polymerization of vinyl compounds can be used in the preparation of the copolymer of this invention. Especially useful catalysts are the azo catalysts described in Hunt U. S. 2,471,959 and the aqueous persulfate systems described in Arnold U. S. 2,486,241. Peroxide compounds, such as hydrogen peroxide, diethyl peroxide and t-butyl hydroperoxide, are also suitable catalysts.

As indicated in the examples, the copolymerization reaction of this invention can be carried out in bulk (no added solvent) or in aqueous media. It is also possible to operate in the presence of organic solvents or diluents, e. g. ethanol and benzene. The copolymerization can be effected either as a batch or continuous flow operation. The pressure employed is not critical; either ordinary or superatmospheric pressure can be employed.

The products of this invention can be used in the preparation of fibers, films, coating compositions, and molded articles. In these various applications the products can be used in admixture with pigments, dyes, plasticizers, antioxidants, resins, and other modifying agents. By virtue of the fact that the copolymers contain hydroxyl groups they can be modified by chemical reaction with agents, e. g., acids, anhydrides, isocyanates, reactive with hydroxyl groups. By employing modifying reactants containing a plurality of functional groups reactive toward hydroxyl groups, e. g., hexamethylene diisocyanate or adipic acid, it is possible to prepare cross-linked insoluble polymers.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A copolymer of allyloxyethanol, in amount from 2 to 90% by weight of the copolymer, with a monomer of the formula $CH_2=CRCN$ wherein R is $(-CH_2-)_nH$ and $n$ is a cardinal number not greater than one.

2. A copolymer of allyloxyethanol with a nitrile of the formula $CH_2=CRCN$ wherein R is $(-CH_2-)_nH$ and $n$ is a cardinal number not greater than one, said copolymer containing, by weight, 2 to 90% allyloxyethanol and 10 to 98% nitrile, the total percent of allyloxyethanol and nitrile being at least 90%.

3. A copolymer of allyloxyethanol, in amount from 5 to 15% by weight of the copolymer, with at least one monomer of the formula $CH_2=CRCN$ wherein R is $(-CH_2-)_nH$ and $n$ is a cardinal number not greater than one.

4. A copolymer of allyloxyethanol, in amount from 2 to 90% by weight of the copolymer, with acrylonitrile.

5. A copolymer of allyloxyethanol, in amount from 5 to 15% by weight of the copolymer, with acrylonitrile.

6. A copolymer of allyloxyethanol, in amount from 2 to 90% by weight of the copolymer, with methacrylonitrile.

7. A copolymer of allyloxyethanol, in amount from 5 to 15% by weight of the copolymer, with methacrylonitrile.

8. A process for the preparation of allyloxyethanol copolymers with a nitrile of the formula $CH_2=CRCN$, wherein R is $(-CH_2-)_nH$ and $n$ is a cardinal number not greater than one, which comprises bringing a mixture of allyloxyethanol and said nitrile in proportions ranging from 1:20 to 60:1 in contact with a free radical polymerization initiator.

9. A process for the preparation of allyloxyethanol copolymers with acrylonitrile which comprises bringing a mixture of allyloxyethanol and acrylonitrile in proportions ranging from 1:20 to 60:1 in contact with a free radical polymerization initiator.

10. A process for the preparation of allyloxyethanol copolymers with acrylonitrile which comprises bringing a mixture of allyloxyethanol and acrylonitrile in proportions ranging from 1:20 to 1:1 in contact in an aqueous medium with a free radical polymerization initiator.

11. A process for the preparation of allyloxyethanol copolymers with methacrylonitrile which comprises bringing a mixture of allyloxyethanol and methacrylonitrile in proportions ranging from 1:20 to 60:1 in contact with a free radical polymerization initiator.

12. A shaped object, having at least one dimension large with respect to another, said object being dye receptive and composed of a copolymer of allyloxyethanol, in amount from 5 to 15% by weight of the copolymer, with at least one nitrile of the formula $CH_2=CRCN$ wherein R is $(-CH_2-)_nH$ and $n$ is a cardinal number not greater than one.

13. A shaped object, having at least one dimension large with respect to another, said object being dye receptive and composed of a copolymer of allyloxyethanol, in amount from 5 to 15% by weight of the copolymer, with acrylonitrile.

HENRY S. ROTHROCK.

REFERENCES CITED

The following references are of record in the file of this patent:

UNITED STATES PATENTS

| Number | Name | Date |
|---|---|---|
| 2,516,928 | Swern | Aug. 1, 1950 |